US009019968B2

(12) United States Patent
Shar et al.

(10) Patent No.: US 9,019,968 B2
(45) Date of Patent: Apr. 28, 2015

(54) METHOD AND SYSTEM FOR MANAGING COMMUNICATION PORTS

(75) Inventors: Alex Shar, Rishon Letzion (IL); Tzion Priav, Ramat Gan (IL); Yishay Gourman, Ramat Gan (IL)

(73) Assignee: RIT Technologies Ltd., Tel Aviv (IL)

( * ) Notice: Subject to any disclaimer, the term of this patent is extended or adjusted under 35 U.S.C. 154(b) by 252 days.

(21) Appl. No.: 13/232,254

(22) Filed: Sep. 14, 2011

(65) Prior Publication Data
US 2013/0064249 A1 Mar. 14, 2013

(51) Int. Cl.
H04L 12/28 (2006.01)
H04L 12/56 (2006.01)
H04Q 1/02 (2006.01)
G06F 15/173 (2006.01)

(52) U.S. Cl.
CPC .................................. H04Q 1/136 (2013.01)

(58) Field of Classification Search
USPC ..................... 439/488, 490; 363/35; 709/238; 370/400
See application file for complete search history.

(56) References Cited

U.S. PATENT DOCUMENTS

| 7,297,018 | B2 * | 11/2007 | Caveney et al. | 439/488 |
| 2002/0085396 | A1 * | 7/2002 | Halvarsson et al. | 363/35 |
| 2005/0132087 | A1 * | 6/2005 | Glinski et al. | 709/238 |
| 2006/0094291 | A1 | 5/2006 | Caveney et al. | |
| 2010/0008482 | A1 | 1/2010 | Tucker | |
| 2010/0210134 | A1 * | 8/2010 | Caveney et al. | 439/490 |
| 2011/0141943 | A1 | 6/2011 | Shifris et al. | |

FOREIGN PATENT DOCUMENTS

EP   1 788 825 A2   5/2007

OTHER PUBLICATIONS

TIA Standard Balanced Twisted-Pair Telecommunications Cabling and Components Standard TIA-568-C2 Aug. 2009 Published by: Telecommunications Industry Association Standards and Technology Dept., 2500 Wilson Boulevard, Arlington, VA 22201 U.S.A.
International Standard ISO/IEC 11801 Edition 2.0 Apr. 2010 Amendment 2—Information Technology—Generic cabling for customer premises IEC Central Office, Geneva, Switzerland.

* cited by examiner

*Primary Examiner* — Helal A Algahaim
*Assistant Examiner* — Mahmoud Ismail
(74) *Attorney, Agent, or Firm* — Pearl Cohen Zedek Latzer Baratz LLP

(57) ABSTRACT

Embodiments of the present invention are directed to a communication system that enables transmitting control signals between communication devices connected with a communication cable. The control signals are either to activate a visual indicator associated with the second port or to request a unique identification number and the signals are transmitted without changing the voltage polarity between the control wires. The communication cable may include at one end a connector having a control circuitry, a visual indicator and a unique identification number.

15 Claims, 4 Drawing Sheets

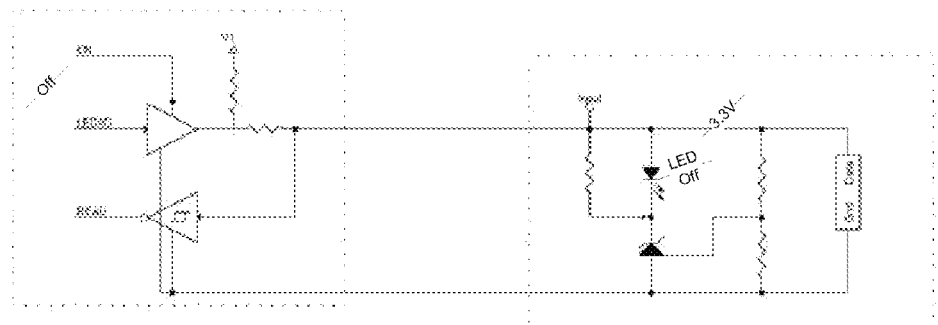
Fig. 4A – Steady State
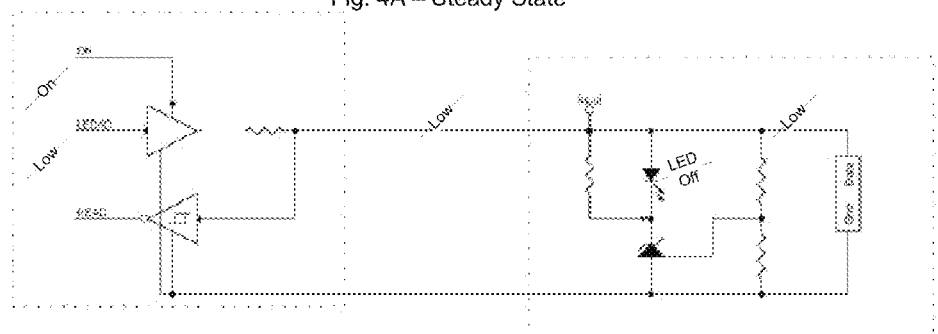
Fig. 4B – Read Request
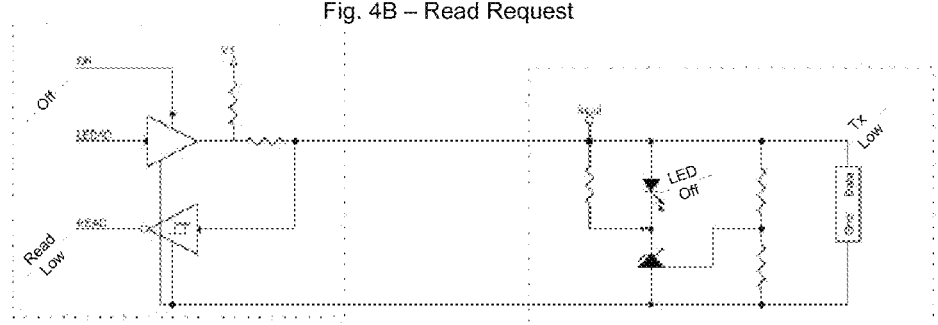
Fig. 4C – Read ID
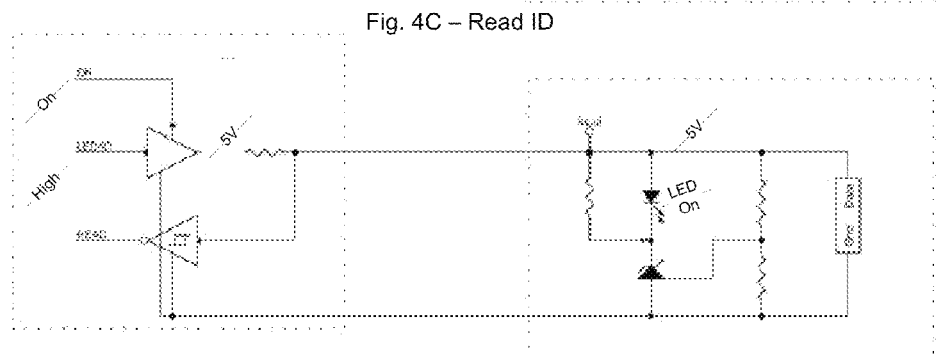
Fig. 4D – LED On

METHOD AND SYSTEM FOR MANAGING COMMUNICATION PORTS

BACKGROUND OF THE INVENTION

The invention relates to managing the physical layer of a communication network. The communication network includes patch panels, which are used as intermediate devices connecting the edge devices to network switches. For example, the physical layer may be arranged in an interconnect network topology using only one patch panel that is placed between the edge devices and the network switch. The patch panel ports may be dynamically connected to the switch ports by multiconductor cables, also known as patch cords or patch cables.

Management of the connectivity includes monitoring and mapping the connection patterns between the end point devices and the network switch, which may require real-time identification (ID) of the communication switch ports to detect changes in the connections between end point devices and the switch.

The ID information of the switch ports may be obtained by a management system coupled to the patch panel, for example, by transmitting control signals, over patch cords connecting between the patch panel and the switch, requesting for the unique ID assigned to the switch ports. The management system may contain a database containing data representing the real-time connectivity status or connectivity map of the communication network, which is updated according to the real-time ID data received over the control signals.

Further, in order for a technician to identify switch ports during installation or removal of patch cord connections—Moves, Adds and Changes (MAC's), visual indicators associated with the required ports may be activated. To activate such an indicator, implemented for example as a light emitting diode (LED), a control signal may be sent from the management system via a patch panel port to the switch port. These actions should be performed without interference to the data transfer using minimal dedicated hardware and control wires.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIGS. 4A, 4B, 4C, and 4D are schematic views of different states of a control circuitry in accordance with embodiments of the invention.

Figure 1:
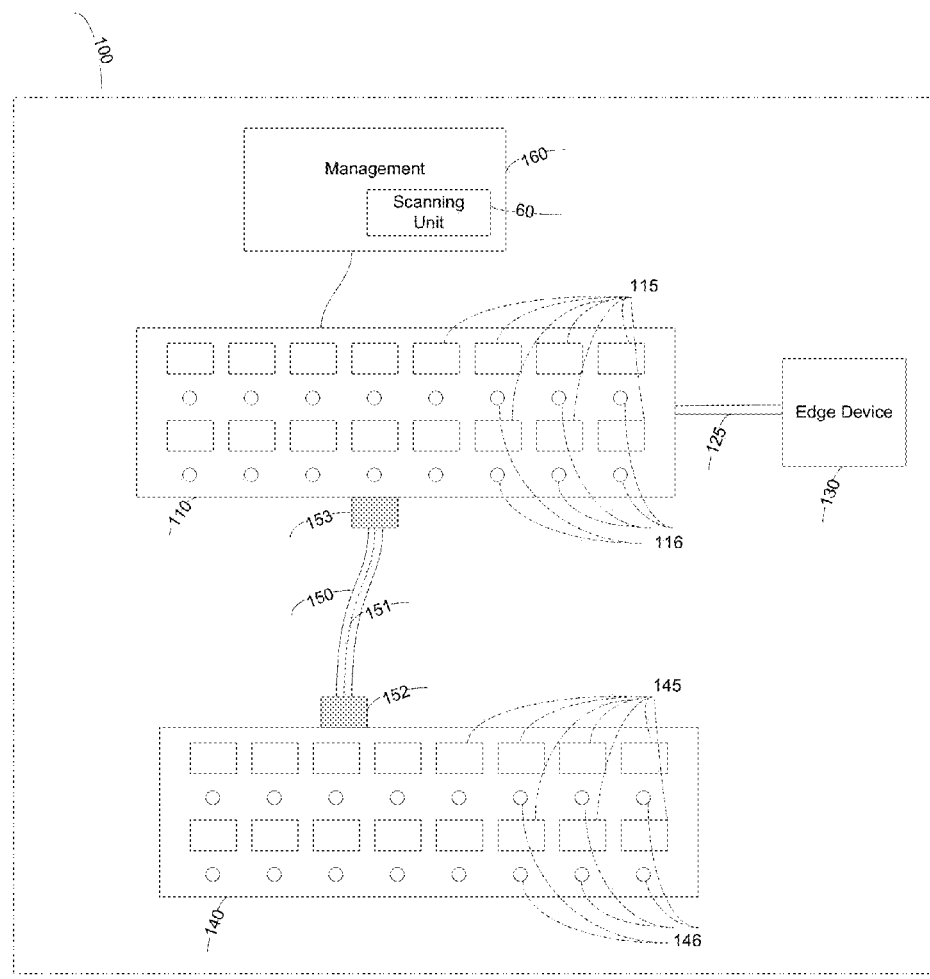
FIG. 1 is a high level illustration of a part of an exemplary communication cabling system in an interconnect network topology in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Embodiments of the present invention are directed to a communication system that enables transmitting control signals between communication devices connected with a communication cable. The control signals are either to activate a visual indicator associated with the second port or to request a unique identification number and the signals are transmitted without changing the voltage polarity between the control wires.

Reference is now made to FIG. 1, which is a high level illustration of a part of an exemplary communication cabling system in an interconnect network topology in accordance with embodiments of the present invention. Communication cabling systems may include patch panels which are used as elements connecting end users, for example, computers or telephones to network switches, such as an Ethernet switch. The connection may be performed by using communication cables such as patch cords. A communication cabling system 100 according to embodiments of the invention may provide real-time monitoring and control of end-to-end physical layer connectivity and further may guide a technician by selective activation of visual indicators to perform required changes in the connectivity pattern.

System 100 may include a smart patch panel 110 coupled to a connectivity management system 160, edge devices or end-point devices, such as an edge device 130, a network switch 140 and patch cables, such as patch cable 150. Network switch 140, such as, for example, an Ethernet switch may be dynamically coupled to patch panel 110 via patch cables, designed according to embodiments of the invention. The term "smart patch panel" as used herein refers to a patch panel capable of transmitting control signals via the communication ports without interfering data transfer. Data signals may be transmitted over the data wires of patch cable 150 according to any known standard, such as for example, TIA/EIA 568-C.2 or ISO/IEC 11801 second edition and control signals may be transmitted over additional dedicated control wires as detailed below.

Patch panel 110 may include a plurality of communication ports 115, also refer herein as patch panel ports and a plurality of visual status indicators 116, each associated with a respective port 115 and a scanning circuitry module (not shown) coupled to management system 160, to the communication ports 115 and to the status indicators 116. These status indicators may be visual status indicators, such as LED's and other indicators. In the exemplary illustration of FIG. 1, for simplicity, only sixteen (16) ports 115 are illustrated, however, it should be understood to a person skilled in the art that the number of communication port may be any suitable number of ports, for example, twenty four (24), thirty two (32) or forty eight (48) ports. Although embodiments of the present invention are not limited in this respect, patch panel 110 may provide the characteristics of a structured cabling system according to international standards, such as TIA/EIA-568-C and ISO/IEC 11801, and performance levels category 5E, 6, 6A and higher, defined in these standards.

Network switch 140 may include a plurality of communication ports 145, also refer herein as switch ports. In the exemplary illustration of FIG. 1, for simplicity, only sixteen (16) ports 145 are illustrated, however, it should be understood to a person skilled in the art that the number of communication port may be any suitable number of ports, for example, twenty four (24), thirty two (32) or forty eight (48) ports. According to some embodiments, network switch may further include a plurality of connectivity status indicators 146, each associated with a respective port 145. These status indicators may be visual status indicators, such as LED's embedded within a patch cable connector, as discussed in detail herein.

Management system 160 may continuously scans the connectivity configuration of all the patch cables to provide end-to-end physical layer connectivity control and real time monitoring. Further, system 160 may activate and control the operation of the visual indicators associated with the communication ports to guide a technician when performing Moves, Adds and Changes (MACs) operations. Management system 160 may include a scanning unit 60 coupled to the scanning module of patch panel 110 that may enable transmission and receipt of control signals over patch cords or other multiconductor cables connecting for example patch panel 110 and network switch 140. Scanning unit 60 may automatically and optionally continuously sense the connection arrangement of the patching cables. In an interconnect network topology, monitoring the connections between patch panel ports and switch ports provides the information regarding the connections between the switch and the end devices. An exemplary management system is sold under the trade name of PATCH-VIEW by RiT Technologies Ltd., Tel Aviv, Israel, the assignee of this patent application.

Edge device 130 is connected to patch panel 110 via a communication cable 125, for example, a standard horizontal cable. Cable 125 may be terminated to a termination block on the rear side of patch panel 110 (not shown). Although embodiments of the invention are not limited in this respect, cable 125 may include an insulated displacement connector (IDC) to be connected to the termination block. The rear termination block is connected directly to one of a plurality of frontal communication ports 115 of patch panel 110.

Patch cable 150 may include a cord 151 with data signal wires (e.g. 8 wires) and control wires (e.g. 2 wires) and two connectors, each at one end of the cord. A first connector or plug 152 is for insertion into one of a plurality of switch ports 145 and a second connector or plug 153 is for insertion into one of the patch panel ports 115.

Connector 152 may be a smart connector embedding dedicated control circuitry and identification unit to provide a simple solution for both transmission switch port ID data and enabling control of visual status indicators of the switch ports without interference to the transmission of the data signals. According to embodiments of the invention, connector 152 may be a two-part modular plug compatible with a suitable standard, such as RJ45 standard. The two-part modular plug is designed with two separable or detachable parts, a first part having an ID number thereon that may be inserted into a communication port to remain constantly located within the switch port and a second part having the LED and control circuitry that remains terminated to the cord. The two-part modular plug is further described herein with reference to FIG. 3A-3C. Connector 153 may be a standard communication plug according to any suitable standard, such as the RJ45 standard or a two-part modular plug compatible with RJ45 standard. The two-part modular plug connected to the patch panel ports may include an ID number and control circuitry.

Although embodiments of the invention are not limited in this respect, the connectors may be, for example, RJ45 connectors or compatible with RJ45 connectors, fiber optic plug, Multiple-Fibre Push-On/Pull-off (MPO/MTP) plug, or any other plug or connector. The insertion of first connector 152 (the switch connector) into one of switch ports 145 of network switch 140 and second connector 153 (the patch panel connector) into one of communication ports 115 of patch panel 110 creates a communication path for the transmission of data signals between network switch 140 and edge device 130.

According to embodiments of the invention, switch connector 152 may include additional circuitry elements that enables transmission of both control signals directed to activation of a visual indicator associated with a switch port and control signals directed to requests for a unique identification (ID) associated with the switch port on the same control wires without changing the voltage polarity, namely by applying in both cases a positive voltage between a first wire and a second wire. These elements may be embedded inside, attached to or mounted onto switch connector 152 or its surroundings.

According to other embodiments, the dedicated electrical circuitry may include a first unit embedded within switch connector 152 and another unit embedded within patch panel port or patch panel connector 153. According to other embodiments of the invention, the dedicated electrical circuitry may be embedded within the switch, e.g., in the designated port position of a switch panel. According to other embodiments of the invention, a switch connector may be a two-part connector having two separable parts, as described herein with reference to FIG. 3B. The first part which remains attached to the cord may include the additional electrical circuitry and the other part which is positioned within the switch port may include the identification number associated with the switch port. According to some embodiments of the invention, dedicated electrical circuitry may be connected, attached, fixed or coupled to the external surface of the switch connector.

Figure 2:
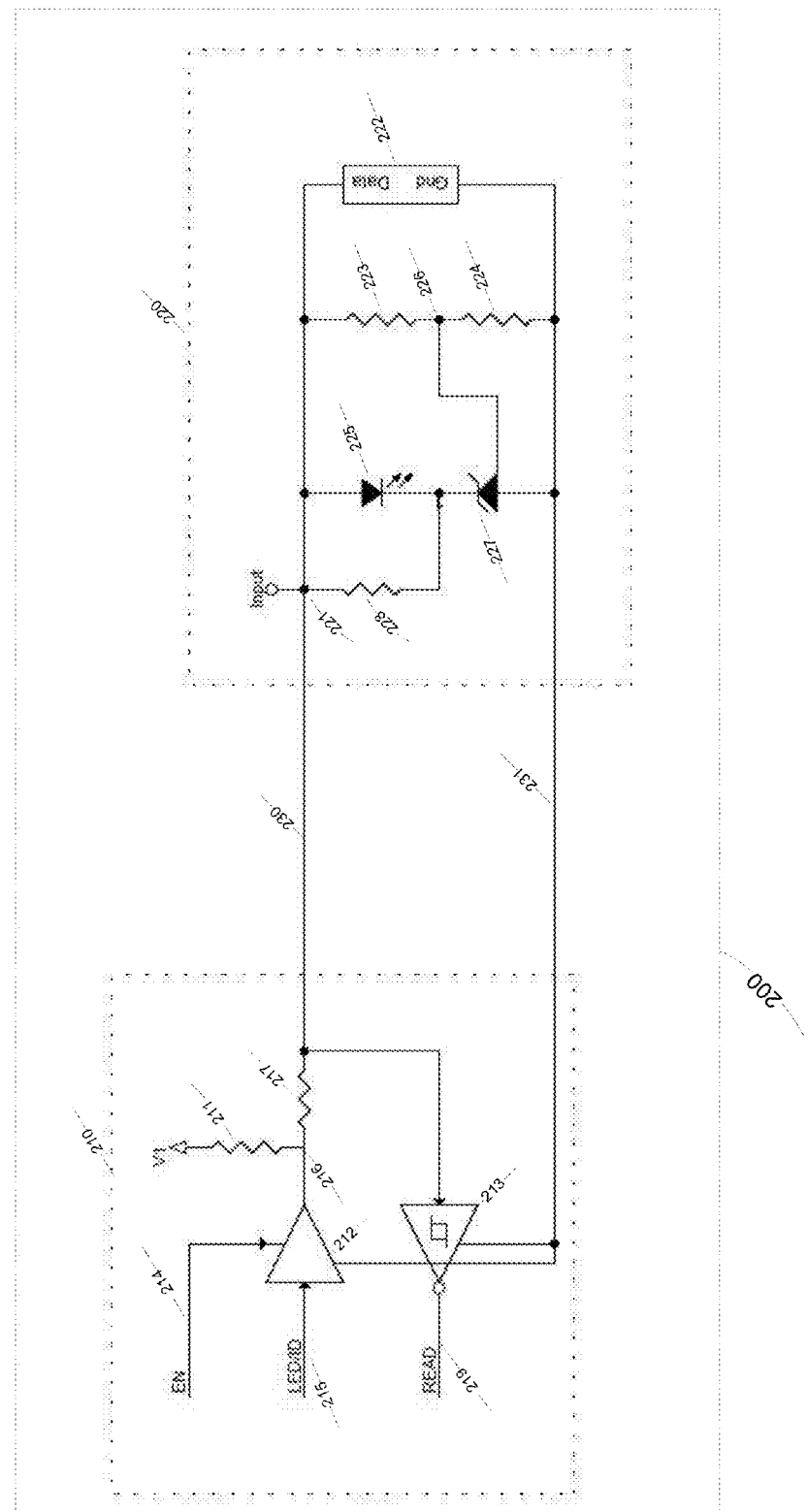
FIG. 2 is a schematic view of an exemplary control circuitry implemented in a patch cable connector and a patch panel port in accordance with embodiments of the invention.

Reference is made to FIG. 2, which illustrates a schematic view of an exemplary control circuitry implemented in a patch cable connector and a patch panel port in accordance with embodiments of the invention. A control circuitry 200 may comprise a first portion embedded within a cable connector of a patch cable (such as patch cable 150 of FIG. 1) and a second portion implemented as control circuitry of a patch panel port in accordance with embodiments of the invention. Control wires 230 and 231 of the patch cable may be connected to a particular switch port via a switch connector (such as connector 152 of FIG. 1), which may include control circuitry 220. The patch cable may be connected to a particular patch panel port having a control circuitry 210 via a patch panel connector (such as connector 153 of FIG. 1). According to other embodiments, control circuitry 210 may be embedded within the patch panel connector.

According to embodiments of the invention, control circuitry 200 may be capable of handling transmission of control signals related to identification of switch ports and activation of visual indicators. For example, when patch cable 150 (of FIG. 1) is plugged into a particular switch port on one end and a particular patch panel port on the other end, both identification data of the switch port and control commands to activate/deactivate a visual indicator associated with the switch cord may be transmitted without reversing the voltage polarity. These control signals are transmitted over the same control wires of the patch panel without changing voltage polarity.

To turn on the visual indication (e.g. a LED), a constant voltage of a predetermined threshold, e.g. a 5 Volt voltage may be required on control wire 230 (as shown in FIG. 4D) while reading the ID may require a lower voltage, for example, a 3.3 Volt voltage (as shown in FIGS. 4B and 4C). Wire 231 is a common ground wire for both, ID read operation and LED activation. Cable 150 may include 8 wires (not shown) for transmission of data and additional two control wires 230 and 231 (FIG. 2). For simplicity and ease of explanation a first connector (e.g., connector 152 of FIG. 1) is referred to as a switch connector and a second connector (e.g., connector 153 of FIG. 1) is referred to as a patch panel connector. It should be understood to a person skilled in the art that these connectors are insertable or connectable to any other suitable device and embodiments of the invention are not limited in that respect.

First connector 152 may include an identification control circuitry 220 that may include an Identification (ID) unit 222 having a unique ID number. The first control circuitry or unit 220 may receive control signals related to the ID number and may further operate a visual indicator coupled to the connector. ID unit 222 may be implemented as a sensor having a self identification capability such as an ID-chip. An example of such an ID-chip may be DALLAS SEMICONDUCTORS DS2401 or DS2402 IC of Maxim Semiconductor Corporation.

It should be noted although ID unit 222 is coupled to first control unit 220, it is not necessarily an integral part of connector 152. According to some embodiments of the invention ID unit 222 may be located within or in the vicinity of the switch port or mounted on patch cord 151 externally to connector 152.

Ports of the patch panel, Such as patch panel 110 of FIG. 1, may include a second control unit 210 that is coupled to management system 160 (of FIG. 1) and connectable to first control unit 220 via control wires 230 and 231. When patch cable 150 is connecting the particular switch and patch panel ports as described above, a management system (such as management system 160 of FIG. 1) may send control signals to first control unit 220 via second control unit 210 and the patch cord wires to either request the unique ID data or activate a visual indicator associated with the particular switch port. Both control signals are transmitted while applying a positive voltage between the two control wires, as detailed herein. It should be understood that although the control wires are described as inserted within a patch cord, embodiments of the present invention are not limited in this respect and wires 230 and 231 may be implemented as two external wires.

According to some embodiments, first control unit 220 may include resistors 223, 224 and 228 for applying resistance of R1, R2 and R3, respectively a LED element 225 connected in parallel to resistor 228 and a shunt regulator 227 connected between resistors 223 and 224 at node 226. Node 226 is referred to herein as a voltage divider 226. Second control unit 210 may include a transmit driver 212 and a read or receive driver 213. Transmit driver 212 may include an "enable" (EN) input 214 and a LED/ID input 215, both capable of receiving commands from management unit 160 and an output 216 connectable to control wire 230. Read driver 213 may be connectable to control wire 230 and able to receive the ID number from first control unit 220 and provide it via a READ output 219, for example to management unit 160. Second control unit 210 may further include resistors 211 and 217 for applying resistance of R4 and R5, respectively. For increased reliability and noise protection, a Schmidt Trigger implemented as driver 213 is provided.

Reference is also made to FIGS. 4A-4D, which are schematic diagrams of the different states of the control circuitry in accordance with embodiments of the invention illustrating different operating conditions. The following states are described below:
1) Idle state represented by FIG. 4A;
2) Read Request state represented by FIG. 4B;
3) Read ID state represented by FIG. 4C; and
4) LED on state represented by FIG. 4D.

During Idle state and Read ID state, a predetermined static positive voltage $V_1$ is provided via resistor 211 of second control unit 210, which may function as a pull up resistor, namely, determining the voltage that would be provided to control unit 220 on the other end of the patch cord cable. To light the visual indicator (LED on state) the pull-up resistor is bypassed and does not affect the control circuitry. In this state a shunt regulator senses the slight change in voltage and switches the LED on. The pull-up resistor is also bypassed during the Read Request state.

Idle State

An Idle state occurs when there is an open communication path between first control unit 220 and second control unit 210 but the visual indicator, e.g., LED 225 is not active (OFF) and no request for ID number has been made. An exemplary circuitry may be configured and a specific voltage may be applied such that at an Idle state certain desired conditions would be fulfilled as follows: A predetermined static positive voltage $V_1$, e.g., 5 volts, may be provided via resistor 211 of second control unit 210, which may function as a pull-up resistor, namely, determining the voltage that would be provided to control unit 220 on the other end of the patch cord cable.

Accordingly, control unit 220 may receive the predetermined static positive voltage $V_1$, which is translated into logic "1" for identification unit 222. In these conditions, resistor 211 serves as a pull-up resistor, and transmit driver 212 is disabled by applying no voltage (logic "0" at its EN input 214). The voltage at point 221 may be high enough, e.g., 3.3 volts, to force logic "1" for identification unit 222, but the voltage at point 226 may be too low to open the gate of shunt regulator 227. As shown in the Diagram of FIG. 4A the voltage arrives to point 226, which functions as a voltage divider via a plurality of resistors, e.g., resistor 211, 217, 223 and 224. As the gate of shunt regulator 227 is closed, the shunt regulator disables the current flow to the ground such that no current passes through LED 225. Accordingly, in the Idle state, the LED is switched off.

Read Request State

For real-time monitoring and mapping of the connection patterns between the edge devices and the network switch, management unit 160 (of FIG. 1) may periodically send to control unit 220 via transmit driver 212 a request for the identification number stored on ID unit 222. According to embodiments of the invention, the exemplary circuitry may be configured such that for read request state the conditions would be as follows. As shown in FIG. 4B, The Read Request state occurs by applying a static low voltage or zero voltage, which translated into logic "0" in its LED/ID input 215. A voltage pulse of a predetermined duration may be applied to EN input 214 of driver 212 and may be transferred via wire 230 to control circuitry 220 as a "high-to-low" pulse. Such a pulse may serve as a "read request", namely, may trigger ID unit 222 to send its ID to control unit 210. An exemplary pulse may be a voltage drop from 3.3 volts to zero volts for duration of 400 nanoseconds applied to LED/ID input 215 and transferred via wire 230 to control circuitry 220.

According to embodiments of the invention, after the read request for providing the ID number is transmitted to control unit 220, the Read Request state may be followed by a Read ID state during which the ID unit 222 may transmit its ID number to the management unit.

Read ID State

A Read ID state may start by turning off EN input 214 of driver 212 by applying zero voltage, translated into logic "0", at its EN input 214. By turning off the EN input, the read-request pulse may be terminated and the output 216 of driver 212 may become tri-stated having high impedance. The voltage at point 216 though is high enough due to the pull up resistor 211. These conditions may enable ID unit 222 to transmit its ID number to control unit 210. Although embodiments of the invention are not limited in this respect, the ID number may be transmitted according to the ONE-WIRE ™ protocol developed by Dallas Semiconductor Corporation. The ID number may be received by read driver 213 and forwarded to management system 160.

LED-ON State

A LED-ON state that includes transmission of control signals with a request for activation of a visual indicator associated with a switch port may be initiated for example by the management unit either automatically upon automatic detection of a change in the connectivity pattern or following input entered by a human. According to embodiments of the invention, the exemplary circuitry may be configured to enter the LED-ON state when transmit driver 212 is enabled by applying static positive voltage V, e.g., 5 volts, translated into logic "1" in its EN input 214 as well as static positive voltage, e.g., 5 volts, translated into logic "1", constantly being applied to LED/ID input 215. The constant positive voltage applied at LED/ID input 215 may be transferred via wire 230 to first control circuitry 220. As a substantial identical voltage, e.g., translated into logic "1", may be applied on both ends of resistor 211, the resistance of resistor 211 may not affect circuit operation. As the logic "1" voltage is divided only between resistor 223 and resistor 224, the voltage at point 226 may be high enough to open the gate of shunt regulator 227 and may allow sufficient current to flow through LED 225 and turned it on.

According to embodiments of the invention, the input voltage measured between wires 230 and 231, implemented for example, by wires 9 and 10 of a communication patch cord, remains positive at all operational states. Applying a voltage with the same voltage polarity between wires 230 and 231 for both requesting ID data and controlling the visual indicators may results in a simple and reliable implementation of the control circuitry 200.

Figure 3A:
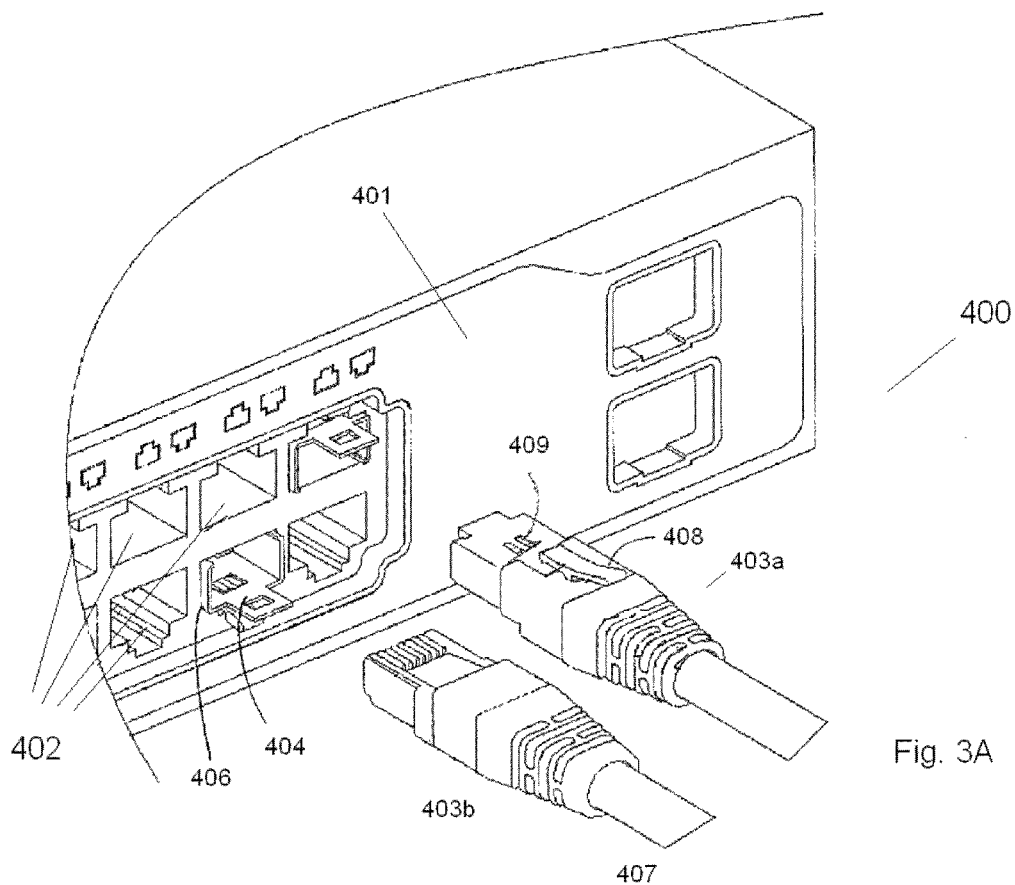
FIGS. 3A, 3B and 3C are pictorial illustrations of an exemplary two-part modular connector according to embodiments of the present invention.
Figures 3B, 3C:
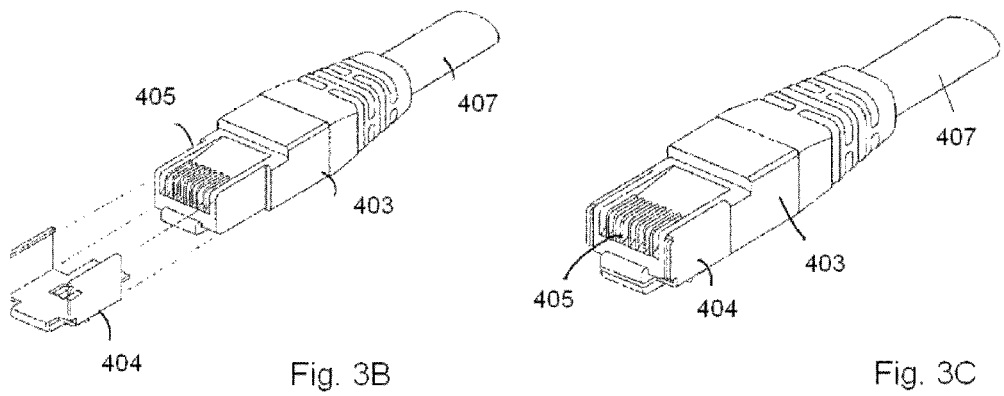

Reference is now made to FIGS. 3A, 3B and 3C which are pictorial illustrations of an exemplary two-part modular connector according to embodiments of the present invention. It should be understood to a person skilled in the art that the two-part connector which is compatible with RJ-45 connector presented in the figures is merely a non-limiting example and embodiments of the invention are not limited in this respect. Accordingly, the two-part connector may be designed according to any other present of future standard for form factor female jack, such as, for example, RJ-45, LC, SC, GG45, Tera, ST, MPO, MPT.

FIG. 3A illustrate a communication panel 401, e.g., a network switch panel. Panel 401 may include a plurality of communication sockets or ports 402. Each of the sockets 402 is able to receive a communication connector or plug 403. Connector 403 may include two parts or elements, a frontal element 404 and a rear element 405 which is terminated at cable cord 407. As illustrated by FIG. 3C, elements 404 and 405 may be combined together to create a smart connector, for example, RJ-45 connector similar to connector 152 of FIG. 1. As illustrated by FIG. 3B, frontal element 404 may be separated from rear element 405 and from patch cord 407 and inserted into a particular one of sockets 402. The upper connector 403a shows a top view of connector 403 without the removed element 404 and the lower connector 403b is the bottom view of such a connector.

According to embodiments of the invention, an identification unit, which may be similar to unit 220 of FIG. 2 that includes a unique ID, may be mounted on, fixed or attached to element 404. The insertion of element 404 into a particular socket, provides a unique ID number to the communication port associated with that socket. It should be understood that element 404 may remain located in the socket even when patch cord 407 and element 405 are removed. Accordingly, the port of the respected socket may be provided with a single unique ID. Element 404 may be removed from socket 406 at any time by a user.

According to embodiments of the invention, element 404 may include a control circuitry (not shown) such as control circuitry 220 of FIG. 2. When connector 403 is inserted into one of socket 402, e.g. socket 406, the control circuitry on element 405 may be electrically connected to the ID unit of element 404 to enable transfer of control signals directed to the unique ID number a LED activation for connectivity indications as described with respect to FIG. 2.

In the exemplary illustration of FIGS. 3A-3C, RJ45-compatible connectors are illustrated, however, it should be understood to a person skilled in the art that any desired form, shape or appearance of a connector may be applicable.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
 a first communication device having a first communication port;
 a second communication device having second communication port;
 a communication cable having two control wires, a first connector insertable into the first communication port and a second connector insertable into the second communication port,
 wherein, when the communication cable is plugged into the first and second communication ports, the system enables transmitting, via the control wires and without changing the voltage polarity between the two control wires, control signals from the first communication device to the second connector, the control signals comprising signals directed to activation of a visual indicator associated with the second port and signals directed to requests for a unique identification number associated with the second port.

2. The system of claim 1, wherein the first communication device is a patch panel device and the second communication port is a network switch.

3. The system of claim 1, wherein the communication cable further comprises data wires and wherein transmission of the control signals via the control wires does not interfere with data transfer via the data wires.

4. The system of claim 1, wherein the second connector comprises electrical circuitry to enable transmission of the control signals and the unique identification number and the visual indicator are embedded within the second connector.

5. The system of claim 4, wherein the visual indicator is a light emitting diode.

6. The system of claim 4, wherein the second connector is a two-part modular connector, wherein the visual indicator is embedded in a first part of the two-part modular connector that is connected to the communication cable and the unique identification number is embedded within a second part of the two-part modular connector that detachable from the first part and located within the second port.

7. The system of claim 6, wherein the two-part modular connector is compatible with a connector according to an RJ45 standard.

8. A communication cable comprising:
   a communication cord with data wires and two control wires;
   a first connector at a first end of the communication cord to connect the data and control wires to a communication port of a first communication device; and
   a second connector at a second end of the communication cord to connect the data wires to a communication port of a second communication device, the second connector comprises:
      a visual indicator;
      an identification unit that stores a unique identification number;
      control circuitry to receive control signals from the first communication device via the control wires, the control signals comprise signals directed to activation of the visual indicator and signals directed to request for unique identification number;
         wherein, when the communication cable is plugged into the first and second communication ports, the control circuitry is configured to transmit to the second connector both the signals directed to the activation of the visual indicator and signals directed to request for the unique identification number without changing the voltage polarity between the two control wires.

9. The system of claim 8, wherein the visual indicator is a light emitting diode.

10. The system of claim 8, wherein the second connector is a two-part modular connector, wherein the visual indicator is embedded in a first part of the two-part modular connector that is connected to the communication cord and the unique identification number is embedded within a second part of the two-part modular connector that detachable from the first part and located within the communication port of the second communication device.

11. The cable of claim 10, wherein the two-part modular connector is compatible with a connector according to an RJ45 standard.

12. The cable of claim 8, wherein the first communication device is a patch panel device and the second communication port is a network switch.

13. A method of managing a communication system, the method comprising:
   providing a connection between a first communication port of a first communication device and a second communication port of a second communication device using a communication cable having two control wires, a first connector inserted into the first communication port and a second connector inserted into the second communication port;
   transmitting from the first communication device to the second connector, via the control wires, control signals that are directed to activation of a visual indicator associated with the second port; and
   transmitting from the first communication device to the second connector, via the control wires, control signals that are directed to a request for a unique identification number associated with the second port,
   wherein the control signals directed to the activation of the visual indicator and the control signals directed to the request for the unique identification number are transmitted without changing the voltage polarity between the two control wires.

14. The method of claim 13, further comprising transmitting data signal via data wires of the communication cable, wherein transmission of the control signals does not interfere with transmission of the data signals.

15. The method of claim 13, wherein the second connector comprises electrical circuitry to enable transmission of the control signals and the unique identification number.

* * * * *